J. C. WESTMONT.
TRACTOR.
APPLICATION FILED JAN. 23, 1920.

1,424,224.

Patented Aug. 1, 1922.
3 SHEETS—SHEET 1.

Witness
Edward T. Wray.

Inventor
John C. Westmont
by Parker Carter
Attorneys

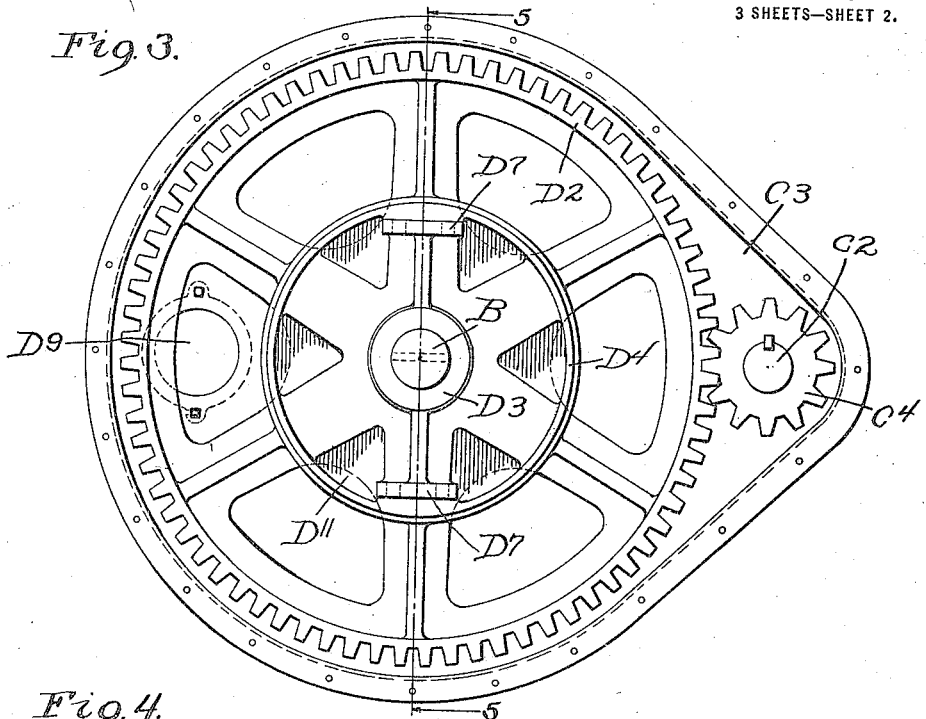
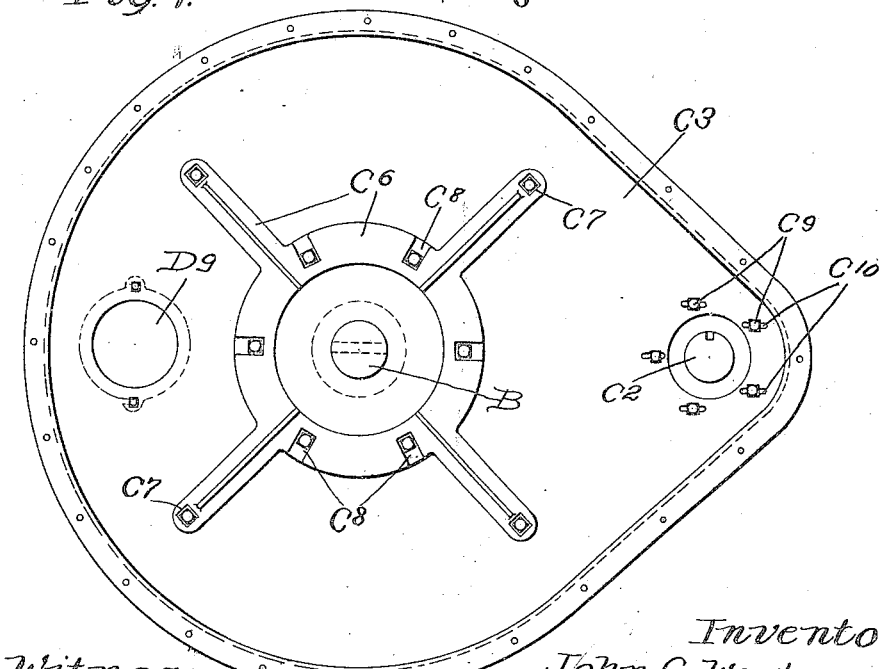

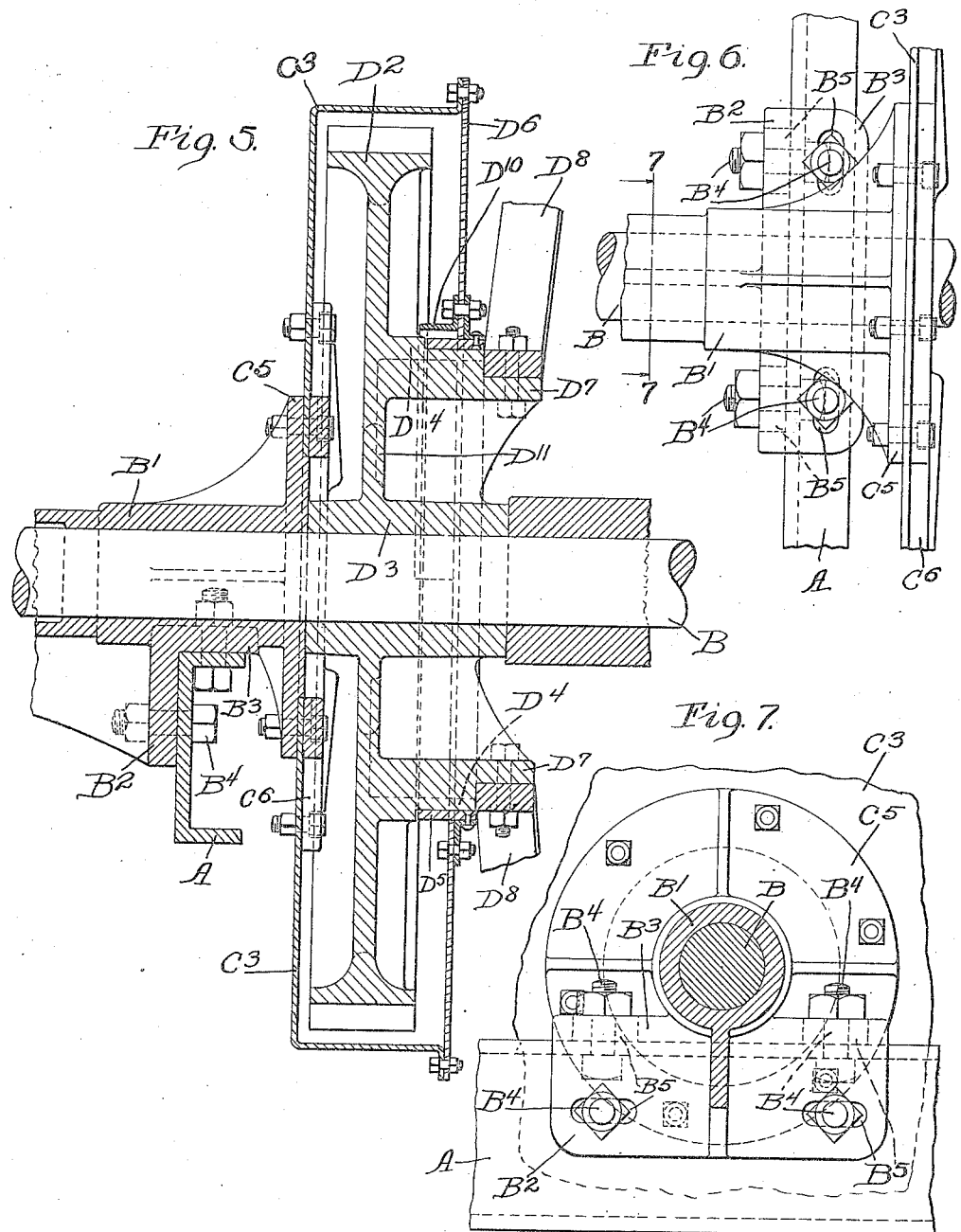

UNITED STATES PATENT OFFICE.

JOHN C. WESTMONT, OF SAUK CITY, WISCONSIN, ASSIGNOR TO WISCONSIN FARM TRACTOR COMPANY, OF SAUK CITY, WISCONSIN, A CORPORATION OF WISCONSIN.

TRACTOR.

1,424,224.   Specification of Letters Patent.   Patented Aug. 1, 1922.

Application filed January 23, 1920. Serial No. 353,509.

*To all whom it may concern:*

Be it known that I, JOHN C. WESTMONT, a citizen of the United States, residing at Sauk City, in the county of Sauk and State of Wisconsin, have invented a certain new and useful Improvement in Tractors, of which the following is a specification.

My invention relates to improvements in tractors for agricultural and other purposes and has for one object to provide a new form of tractor. Another object is to provide a new rear axle construction and driving mechanism. Other objects will appear from time to time in the specification.

My invention is illustrated more or less diagrammatically in the accompanying drawings wherein:

Figure 3 is a side elevation on a large scale of the gear drive with cover removed;

Figure 4 is a detail of the gear casing similar to Figure 3 but with the gear and pinion removed showing the re-enforcing spider;

Figure 5 is a section along the line 5—5 of Figure 3;

Figure 6 is a detailed plan view of the end of the cannon bearing showing adjustment on the frame;

Figure 7 is a section along the line 7—7 of Figure 6.

Like parts are indicated by like characters in all the drawings:

Figure 1:
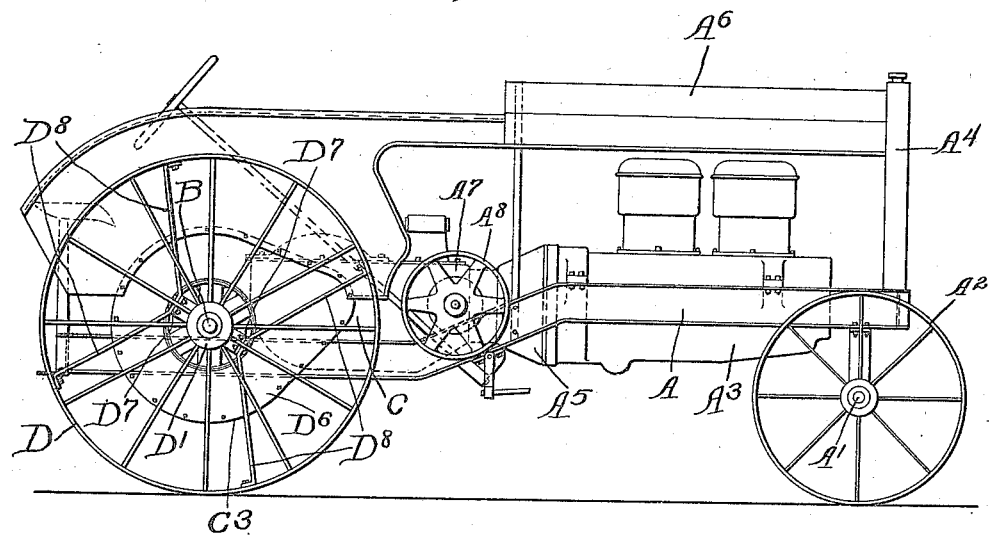
Figure 1 is a side elevation of a tractor showing the outline of the engine and associated parts with many details omitted.
Figure 2:
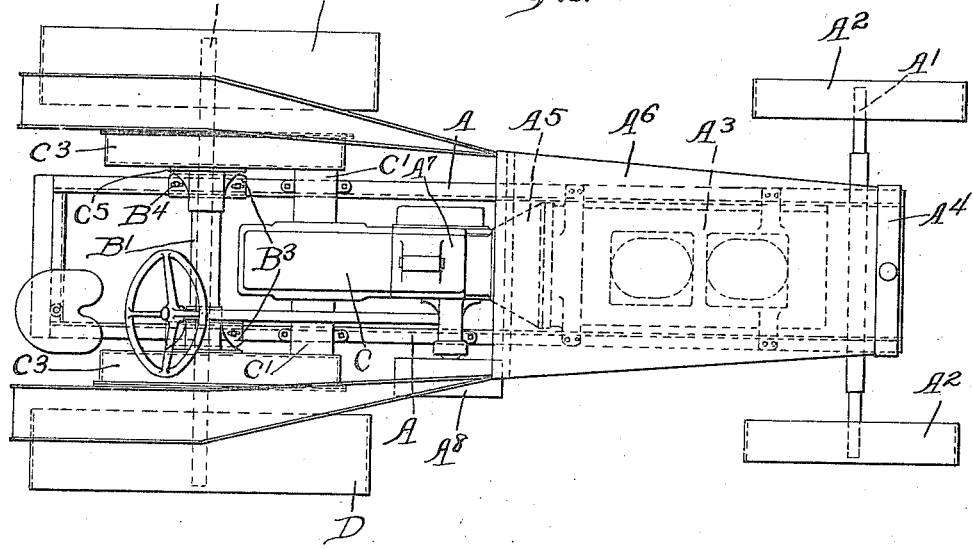
Figure 2 is a plan view of the tractor shown in Figure 1.

A is the engine frame supported at its front end on the front axle $A^1$ connected with the front steering wheels $A^2$. $A^3$ is an engine. $A^4$ is the radiator. $A^5$ is the clutch housing. $A^6$ is a hood or cover protecting the engine from the elements. $A^7$ is the gear casing and $A^8$ is a belt pulley driven by the engine through the gear case.

B is a rear axle mounted for rotation in the cannon bearing $B^1$. This bearing is located on the upper side of the main frame and has the side bearing flanges $B^2$—$B^2$ engaging the inside of the frame and the horizontal bearing surfaces $B^3$ $B^3$ engaging the upper side of the frame. These flanges and the bearing itself are held in position on the frame by the bolts $B^4$ $B^4$ which engage slots $B^5$ $B^5$ extending parallel to the axis of the engine frame whereby the rear axle in its bearing is adjustable longitudinally along the engine frame.

C is a differential housing associated with the gear case or transmission box $A^7$ and having outwardly extending tubular arms $C^1$ $C^1$ resting on the engine frame. These tubular arms enclose the bull pinion shafts $C^2$ $C^2$ one on either side of the engine and engage at their outer ends the gear housing $C^3$ so that the pinions $C^4$ themselves are contained within the housing. This housing is mounted on the end of the cannon bearing which is flanged as at $C^5$ for that purpose. $C^6$ is a re-enforcement spider on the inside of the housing. This spider is recessed as at $C^7$ $C^8$ to engage bolt heads which hold the spider and the housing in position on the cannon bearing or which merely hold the spider rigidly against the housing wall as the case may be. The bolt heads being held against turning, the bolts can easily be tightened from the outside during the assembly of the engine when the parts are to be assembled in working position. The housings $C^3$ $C^3$ are attached to the ends of the tubular arms $C^1$ by means of cap screws $C^9$ which engage the slots $C^{10}$ so disposed that when adjustment of the distance between the pinion or jack shafts $C^2$ and the driving axle is necessary to compensate for differences in the gears, the housing may be adjusted accordingly the cap screws sliding in the slots.

D D are the rear driving wheels of any ordinary type made up for instance, as indicated, of an annular rim with radial spokes projecting from a hub $D^1$, one of the hubs being preferably keyed on the driving axle, the other floating thereon so as to permit operation of the differential. $D^2$ is the bull gear, there being one for each driving wheel, which is provided with a hub $D^3$ mounted on the shaft B. $D^4$ is a flange projecting from the bull gear inside its periphery. The flange is in slidable engagement with a collar $D^5$ mounted in the cover $D^6$ of the gear case $C^3$ so that the web $D^{11}$ between the hub and the flange $D^4$, and the gear case cover $D^6$ provide a dust and oil-tight housing for the bull gear and bull pinion, the only opening into which during operation is along relatively extended surfaces between the flange $D^4$ and the collar $D^5$. $D^7$ $D^7$ are lugs projected outwardly from the bull gear $D^2$ and the flange $D^4$ adapted to have bolted to them the V shaped driving members $D^8$ the ends of which are bolted to the wheel rim so that these two lugs provide the driving connection to the wheel and are more or less equally spaced out. Thus the wheel itself and its hub carry no driving load but only supports the weight of the apparatus while the drive is taken by the rim of the wheel alone. $D^9$ is a handhole cover whereby access is had to the interior of the bull gear housing in order to keep it properly filled with lubricant. In normal operation this housing is kept filled with a heavy grease to a point perhaps slightly below the lower edge of the collar $D^5$ so that there is no tendency for the grease to work out between the collar $D^5$ and the flange $D^4$, but when the tractor is operating with one wheel on the land side and the other wheel in the furrow while plowing, the lower housing is inclined and there is a tendency for grease to work off or drop off the bull gear and flow down the gear case cover, and in order to prevent any of this grease working its way out around the flange $D^4$, I provide a protecting collar $D^{10}$ extending down to or below the outer line of the gear so that any grease traveling down the wall of the gear case cover is deflected to one side and passes around the space where it might otherwise escape.

It will be evident from my drawings and specifications that while I have shown an operative device, still many changes might be made both in size, shape and arrangement of parts without departing materially from the spirit of my invention. I wish therefore that my drawings be regarded as in a sense diagrammatic.

The use and operation of my invention are as follows:

It is necessary to provide, in any tractor a point for the attachment of the plows relatively near to the ground in order that the plows may seek their proper level automatically as plows are supposed to do. I provide that low level plow attachment by bending the frame members downwardly and rearwardly immediately behind the engine and in front of the axle so that the rear end of the frame serves as a draw bar itself.

The rear axle is located above the frame and the frame is hung thereon by clips or brackets which extend downwardly from a cannon bearing adjacent either end thereof. The result is that the drive wheels may be sufficiently large to provide satisfactory traction and at the same time the frame is at the point where plows can be directly attached without bracing.

The operator's station is on this lower part of the frame behind the rear axle where he can observe the plows, the operation of the engine, and at the same time, drive the machine.

The engine is supported on the upper or raised portion of the frame and, therefore, is raised above the front axle which is free to swing beneath the frame and engine to permit a small turning radius. The rear axle provides a heavy axle shaft contained within the cannon bearing. On either end of this shaft are mounted bull gears having outwardly projecting annular flanges from which project driving lugs. The wheels themselves are mounted on the ends of the axle shafts and are provided with driving bars projecting inwardly from the wheel rims and bolted on said lugs. The engine drives through a gear box and a jack shaft and having bull pinions on the ends thereof in mesh with the bull gears. The transmission housing is mounted in fixed position on the frame. The cannon bearing is rigidly fastened on the frame by means of slotted bolt holes, whereby for the purpose of adjustment, the cannon bearing can be moved toward and from the transmission, to compensate for difference in size of gears and pinions in assembly and particularly to compensate for wear in operations.

Each bull gear and pinion is contained within a pear shaped, stamped or drawn steel housing. This housing is bolted to the frame on the end of the cannon bearing. It is interiorly re-enforced by a spider bolted to the housing and surrounding the axle, and at the apex is bolted to the hubs projecting outwardly from the transmission housing. The bolt holes at this point, take the form of slots to provide for adjustment of the point of attachment of the housing when adjustment of the rear axle is made. This housing is normally filled with grease or lubricant and the pinions are protected by aperture cover which fits snugly on the annular collar, this collar projecting through sufficiently to prevent ingress of dust and dirt and of grease or oil.

In order to prevent the oil from running down on the side of the collar from above when the tractor is running with one wheel in the furrow, a deflector is provided and this guides any oil or grease which may have dropped off the bull gear onto the downwardly inclined gear cover and deflects it so that it will be discharged down into the bottom of the housing.

It will be noted therefore, that the housing for the bull gear is not carried on the frame. It is bolted to, and carried by the flanges on the end of the cannon bearing and the flanges on the ends of the sleeves surrounding the jack shaft, and this housing assist in properly spacing the jack shaft and axle and keeping them in parallelism.

It will be understood that the necessity for the spiders on the inside of the housing is that there is a limit to the thickness of steel that can be stamped as this is. In order to get the desired strength, this spider is used. The spider has square holes to engage the heads of the bolts which are tightened up from the outside to fasten the spider and housing together.

I claim:

1. In a traction engine, a main frame, a cannon bearing extending thereacross, an axle mounted for rotation within said cannon bearing and extending outwardly on both sides of the frame and brackets projecting from said cannon bearing and adjustably attached to the frame, said brackets extending downwardly from the cannon bearing, the frame being suspended thereon below the axle.

2. A gear case comprising an integral, deep, drawn metal housing, a rotating part therein having a projecting cylindrical flange, a cover for the case apertured to closely engage the periphery of the flange where it projects and a fixed deflector on the inside of the cover adapted to prevent movement of fluid along the cover toward the flange.

3. A gear case comprising an integral, deep, drawn metal housing, a rotating part therein having a projecting cylindrical flange, a cover for the case apertured to closely engage the periphery of the flange where it projects and a fixed deflector on the inside of the cover adapted to prevent movement of fluid along the cover toward the flange, a reinforcing spider located on the inside of the case, holding bolts adapted to attach the spider to the wall of the case, the spider being provided with polygonal holes to engage the heads of the holding bolts and hold them against rotation.

4. A gear case, a rotating part therein having a projecting cylindrical flange, a cover for the case apertured to closely engage the periphery of the flange where it projects and a fixed deflector on the inside of the cover adapted to prevent movement of fluid along the cover toward the flange.

5. A gear case, a rotating part therein having a projecting cylindrical flange, a cover for the case apertured to closely engage the periphery of the flange where it projects and a fixed deflector on the inside of the cover adapted to prevent movement of fluid along the cover toward the flange, a reinforcing spider located on the inside of the case, holding bolts adapted to attach the spider to the wall of the case, the spider being provided with polygonal holes to engage the heads of the holding bolts and hold them against rotation.

6. The combination with a gear and pinion of shafts therefor, a housing enclosing them apertured to permit passage of the shafts, means for rigidly attaching the housing to the bearings for said shafts, one of said attachments being adjustable to permit adjustable movement of the shafts toward and from one another.

7. The combination with a gear and pinion of shafts therefor, a housing enclosing them apertured to permit passage of the shafts, means for rigidly attaching the housing to the bearings for said shafts, one of said attachments being adjustable to permit adjustable movement of the shafts toward and from one another, said adjustment including a plurality of bolt slots through the wall of the housing the major axes of which are parallel with the line joining the centers of rotation of the two shafts.

8. In a motor vehicle, a jack shaft permanently positioned on the vehicle frame, a driving axle adjustably positioned on the vehicle frame, bull gears on the axle and bull pins on the shaft in mesh with one another, a housing free from the frame and in adjustable relation thereto but rigidly mounted on the axle and shaft bearings enclosing each meshing gear and pin.

9. In a motor vehicle, a jack shaft permanently positioned on the vehicle frame, a driving axle adjustably positioned on the vehicle frame, bull gears on the axle and bull pins on the shaft in mesh with one another, a housing free from the frame and in adjustable relation thereto but rigidly mounted on the axle and shaft bearings enclosing each meshing gear and pin, the housing being adapted to enclose the working parts at all adjustable positions.

10. A tractor having a driving axle, a bull gear mounted on the axle, a driving wheel mounted on the axle, driving lugs projecting from the bull gear and driving yokes extending from the lugs to the wheel rims to take the drive.

11. A tractor having a driving axle, a bull gear mounted on the axle, a driving wheel mounted on the axle, driving lugs projecting from the bull gear and driving yokes extending from the lugs to the wheel rims to take the drive, a housing for the bull gear, a flange associated with the yokes projecting out of the housing and a dust and oil tight cover enclosing said housing and surrounding and in engagement with said flange.

12. In a traction engine, a drive shaft, a gear thereon, a housing therefor, a dust and oil tight closure for said housing through which a driving part of said gear projects and a driving wheel adapted to be driven by said part, the driving part comprising a cylindrical flange projecting through the housing and in engagement with the apertured wall thereof, lugs projecting beyond such flange and in connection between them and the wheel rim.

13. In a traction engine, a drive shaft, a gear thereon, a housing therefor, a dust and oil tight closure for said housing through which a driving part of said gear projects, driving lugs thereon and a driving wheel adapted to be driven by said part, the wheel being removable from the axle without disturbance of the gear and driving lugs.

14. In a traction engine, a drive shaft, a gear thereon, a housing therefor, a dust and oil tight closure for said housing through which a driving part of said gear projects and a driving wheel adapted to be driven by said part, the driving part comprising a cylindrical flange projecting through the housing and in engagement with the apertured wall thereof, lugs projecting beyond such flange and in connection between them and the wheel rim, the wheel being removable from the axle without disturbance of the gear and driving lugs.

15. The combination of a tractor frame of a drive axle and cannon bearing therefor extending across the frame, a power transmission and a jack shaft passing therethrough and extending across the frame, sleeves extending from a transmission housing enclosing the jack shaft and terminating in line with the ends of the cannon bearing and a chain of gears interposed between the axle and the jack shaft and the housing enclosing them, said housing being supported only on the cannon bearing and jack shaft sleeves.

16. The combination of a tractor frame of a drive axle and cannon bearing therefor extending across the frame, a power transmission and a jack shaft passing therethrough and extending across the frame, sleeves extending from a transmission housing enclosing the jack shaft and terminating in line with the ends of the cannon bearing and a chain of gears interposed between the axle and the jack shaft and the housing enclosing them, means associated with the cannon bearing and extending downwardly to the frame for suspending the frame therefrom.

17. The combination of a tractor frame of a drive axle and cannon bearing therefor extending across the frame, a power transmission and a jack shaft passing therethrough and extending across the frame, sleeves extending from a transmission housing enclosing the jack shaft and terminating in line with the ends of the cannon bearing and a chain of gears interposed between the axle and the jack shaft and the housing enclosing them, said housing being supported only on the cannon bearing and jack shaft sleeves, means associated with the cannon bearing and extending downwardly to the frame for suspending the frame therefrom.

18. The combination of a tractor frame of a drive axle and cannon bearing therefor extending across the frame, a power transmission and a jack shaft passing therethrough and extending across the frame, sleeves extending from a transmission housing enclosing the jack shaft and terminating in line with the ends of the cannon bearing and a chain of gears interposed between the axle and the jack shaft and the housing enclosing them, means associated with the cannon bearing and extending downwardly to the frame for suspending the frame therefrom, said means being laterally adjustable along the frame.

19. The combination of a tractor frame of a drive axle and cannon bearing therefor extending across the frame, a power transmission and a jack shaft passing therethrough and extending across the frame, sleeves extending from the transmission housing enclosing the jack shaft and terminating in line with the ends of the cannon bearing and a chain of gears interposed between the axle and the jack shaft and the housing enclosing them, said housing being supported only on the cannon bearing and jack shaft sleeves, means associated with the cannon bearing and extending downwardly to the frame for suspending the frame therefrom, said means being laterally adjustable along the frame.

20. A tractor having an integral combined main frame and draw bar comprising two substantially horizontal portions joined by an inclined portion, the rear axle extending across above and supporting the lower portion or rear part of the frame and being longitudinally adjustable therealong, and a front axle beneath and supporting the forward part of the frame, a tractor engine located on that part of the frame which is above the front axle.

Signed at Sauk City, county of Sauk and State of Wisconsin, this 19th day of January 1920.

JOHN C. WESTMONT.